No. 712,334. Patented Oct. 28, 1902.
J. A. ROBERTSON & C. E. HUTCHINGS.
DIVIDED BED PHOTOGRAPHIC CAMERA.
(Application filed Apr. 4, 1902.)

(No Model.) 2 Sheets—Sheet 1.

Witnesses.
Robert Everett.

Inventors.
John A. Robertson.
Charles E. Hutchings.
By James L. Norris
Atty.

No. 712,334. Patented Oct. 28, 1902.
J. A. ROBERTSON & C. E. HUTCHINGS.
DIVIDED BED PHOTOGRAPHIC CAMERA.
(Application filed Apr. 4, 1902.)
(No Model.) 2 Sheets—Sheet 2.
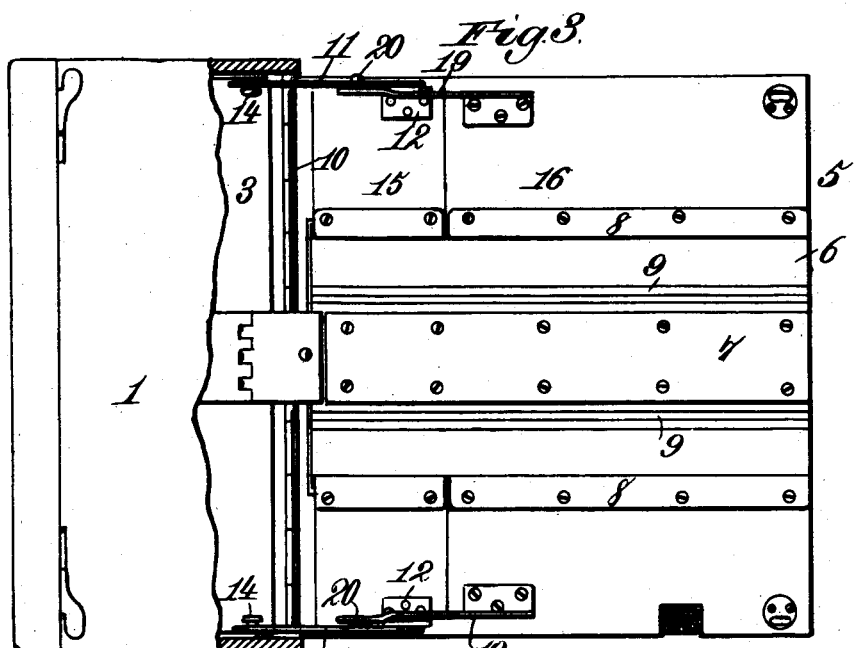
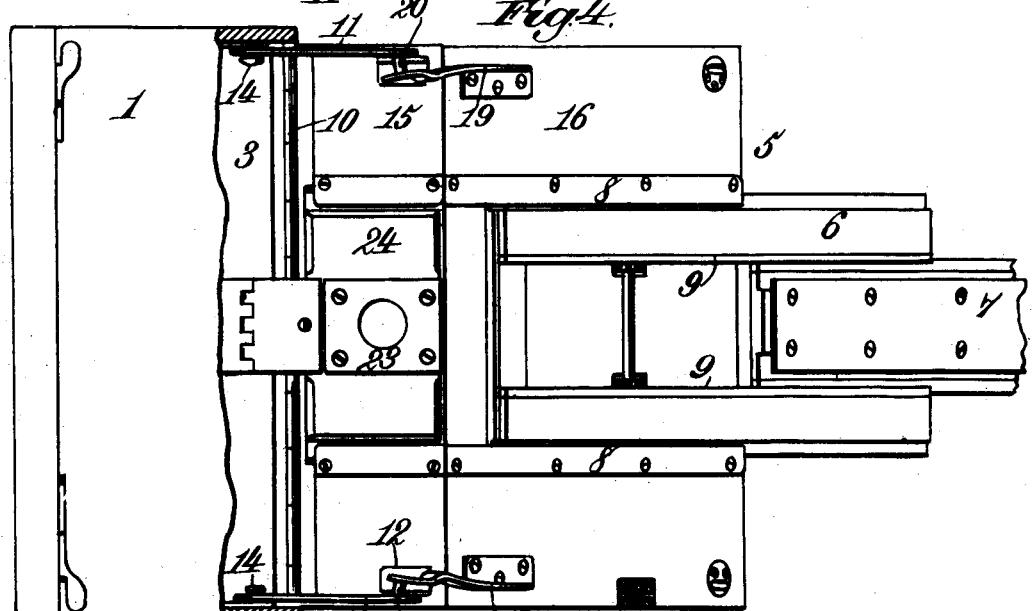
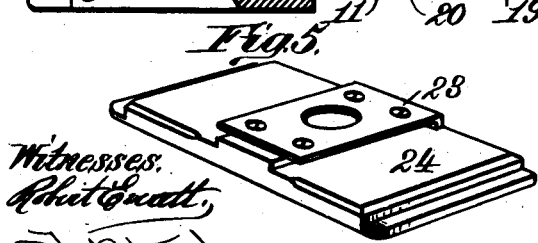
Witnesses. Inventors.
John A. Robertson,
Charles E. Hutchings,
By James L. Norris.
Atty.
THE NORRIS PETERS CO., PHOTO-LITHO., WASHINGTON, D. C.

UNITED STATES PATENT OFFICE.

JOHN A. ROBERTSON AND CHARLES E. HUTCHINGS, OF ROCHESTER, NEW YORK, ASSIGNORS TO ROCHESTER OPTICAL AND CAMERA COMPANY, OF ROCHESTER, NEW YORK, A CORPORATION OF NEW YORK.

DIVIDED-BED PHOTOGRAPHIC CAMERA.

SPECIFICATION forming part of Letters Patent No. 712,334, dated October 28, 1902.

Application filed April 4, 1902. Serial No. 101,401. (No model.)

*To all whom it may concern:*

Be it known that we, JOHN A. ROBERTSON and CHARLES E. HUTCHINGS, citizens of the United States, residing at Rochester, in the county of Monroe and State of New York, have invented new and useful Improvements in Divided-Bed Photographic Cameras, of which the following is a specification.

Our invention relates to photographic cameras of that class in which a divided or two-part bed is employed provided with means whereby one of said parts may be swung downwardly independently of the other to enable the camera to be used with a wide-angle lens at a short focus.

The object of our invention is to provide novel means for locking the two parts of the bed or bed-support in line with each other and means for supporting the swinging part of said bed or bed-support from the other part when the former is moved to its depressed or inclined position.

Other objects and advantages of the invention will hereinafter appear, and the novel features thereof will be set forth in the claims.

Figure 1:
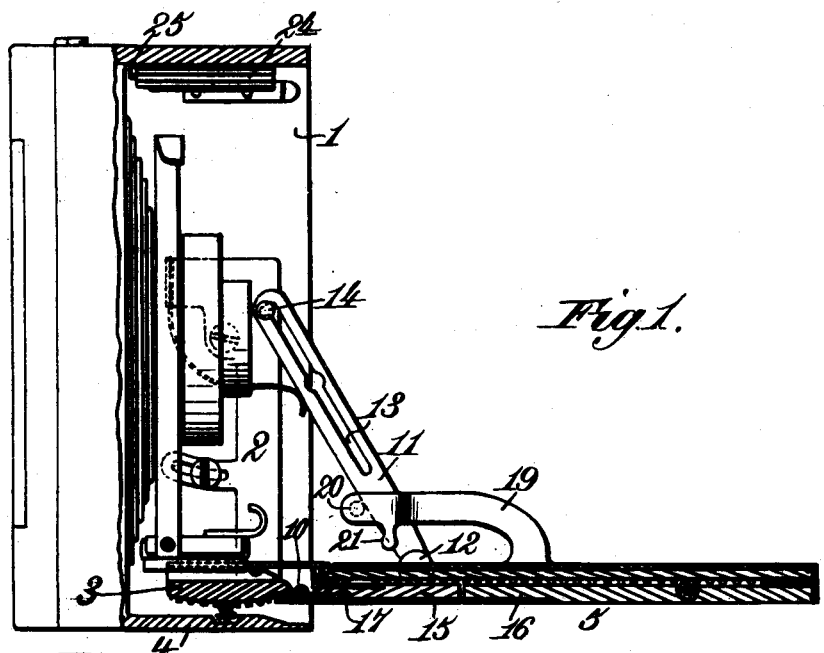
Figure 2:
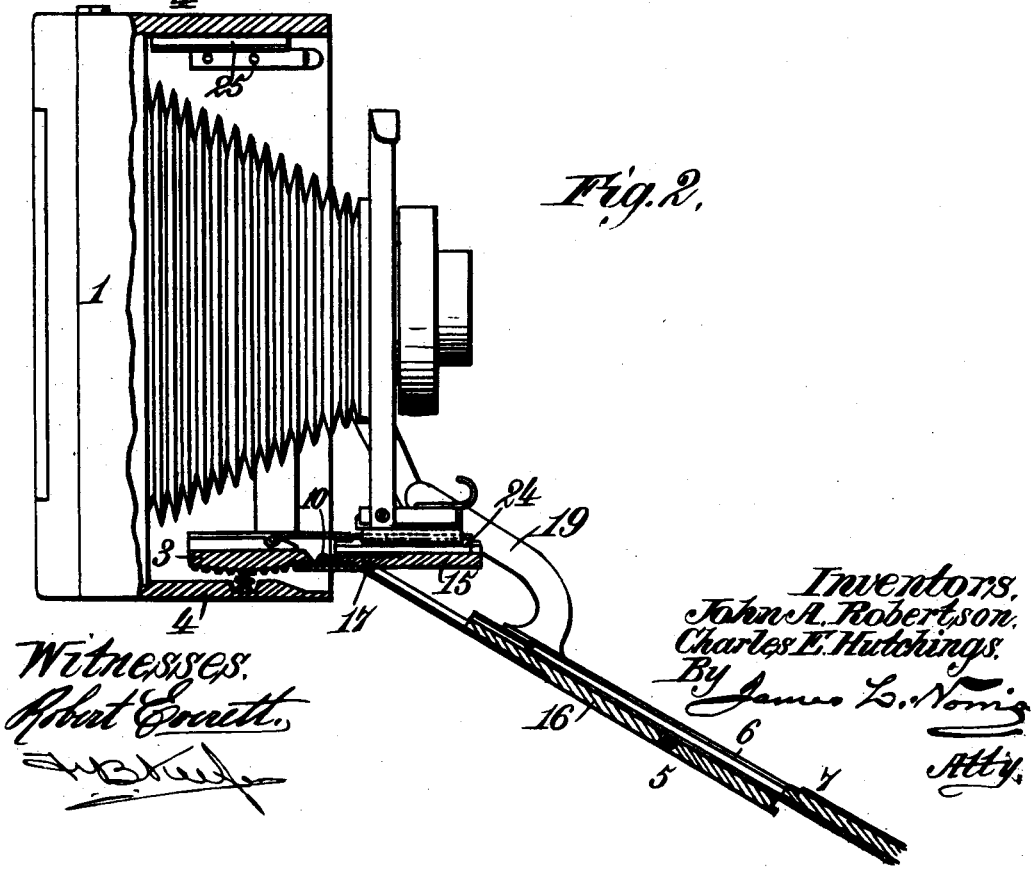

In the drawings forming part of this specification, Figure 1 is a sectional elevation of a camera embodying our improvements, showing the two parts of the divided bed locked to each other in horizontal position. Fig. 2 is a similar view showing the outer part of the divided bed swung downwardly. Figs. 3 and 4 are plan views showing the parts in the positions in which they appear in Figs. 1 and 2, respectively. Figs. 5 and 6 are perspective views of details of construction.

Like reference-numerals indicate like parts in the different views.

Our invention has been illustrated in connection with a swing-back camera in which the sides of the camera-box 1 are pivoted at points intermediate their ends to the uprights or supports 2, connected at their lower ends by a cross-bar 3, located a short distance above the bottom 4 of the camera-box, suitable mechanism being provided for swinging the box 1 on the pivots connecting it with the supports 2 or for swinging the supports 2 and the connecting cross-bar 3 on said pivots with respect to the box 1. As this construction, however, is fully described in a separate application filed by us concurrently herewith, Serial No. 101,398, a detailed description of the same is not deemed necessary herein. So far as the present invention is concerned, the cross-bar 3 might be permanently connected with or form a part of the bottom 4 of the camera-box.

Hinged to the cross-bar 3 is a divided or two-part cover 5 for the front of the camera-box, the same serving when in its horizontal open position as the camera-bed or as the support therefor. For clearness of description we prefer to term the part 5 in this specification the "bed-support," the bed as a whole being made up of said bed-support 5, the extensible bed-section 6, and the extensible bed-section 7. These three parts constitute an extension camera-bed of substantially the same construction as that disclosed in United States Letters Patent No. 682,081, granted to Charles Hutchings September 3, 1901. The bed-support 5 is provided with a guideway 8, along which the extensible section 6 is adapted to slide, and the section 6 is provided with a guideway 9, along which the extensible section 7 is adapted to slide. Suitable means for extending and retracting the sections of the bed are provided, the same being of substantially the same construction as that disclosed in the prior patent above referred to. In addition to its hinged connection 10 with the cross-bar 3 the bed-support 5 is connected with the camera-box by means of the links 11, pivoted at their lower ends to lugs or brackets 12 on said bed-support and provided with elongated slots 13, in which fit the fixed pins or projections 14 on the inner surfaces of the sides of the camera-box. The elongated slots 13 provide for the opening and closing movement of the bed-support, and the pins 14, which are adapted to engage the upper ends of the slots 13, serve to limit the downward movement of the bed-support in the usual manner. The bed-support 5 is itself made in two parts, which during the ordinary operations of the device lie in the same plane with each other and form continuations one of the other. The part 15 of the bed-support is connected directly, by means of the hinge 10, with the cross-bar 3 and has secured to it the lugs or brackets 12, to which the links 11 are pivoted. The part 16 of the bed-support is hinged to the under side of the part 15, as shown at 17, and is adapted to swing downwardly on the hinges 17 independently of the part 15. It will be noted that the hinges 17 are located at a point adjacent to the hinge 10—that is, they are removed from the outer or forward edge of the part 15 of the bed-support. To provide for the connection of the part 16 of said bed-support with the hinges 17, the latter part is provided with an extension 18, which overlaps or covers the under side of the part 15. When the two parts 15 and 16 of the bed-support are in their normal positions, the upper surfaces thereof lie in substantially the same plane, and the meeting edges thereof form a close joint. The guideway 8, heretofore referred to as being formed on the bed-support 5, must of necessity, in view of the construction just described, be made in two parts, secured, respectively, to the two parts 15 and 16 of said bed-support.

Secured to the part 16 of the bed-support, extending upwardly and rearwardly therefrom and coöperating with the links 11, are the arms 19, the said arms being located adjacent to the opposite side edges of the part 16. The arms 19 are capable of lateral yielding movement, for which purpose the same are preferably constructed of spring metal, and the free ends of said arms are provided with laterally-extending lugs or projections 20, adapted to engage, and, in fact, normally engaging, the inner edge of the links 11. When the parts are thus disposed, the outer part 16 of the bed-support is held locked to the part 15 thereof, and swinging movement of the part 16 on the hinges 17 is prevented. This movement of the part 16, however, is still further prevented, when the extension-bed is in its retracted position, by the engagement of the section 6 with the two parts of the guideway 8 on the two parts 15 and 16 of the bed-support. When it is desired to use a wide-angle lens upon an object close to the camera, the sections 6 and 7 of the extension-bed are moved outwardly until the rear edge of the section 6 passes beyond the part 15 of the bed-support 5. The free ends of the arms 19 are then moved laterally, so as to disengage the lugs or projections 20 thereon from the links 11. The part 16 of the bed-support 5 may then be swung downwardly on the hinges 17, so as to remove the same from the range of the wide-angle lens in the camera-front. To prevent the part 16 of the bed-support from being swung downwardly too far and to support the same when in its depressed position, we form upon the spring-arms 19 the depending fingers or projections 21, which are adapted to engage the base portions of the lugs or brackets 12. The said fingers therefore constitute stops for limiting the downward-swinging movement of the part 16 of the bed-support and also serve to support the part 16 when in its depressed position.

It will be noted that when the part 16 of the bed-support is in its depressed position the runway 22 on the section 7 of the extension-bed, on which the camera-front is adapted to slide, is removed from its location above the part 15 of the bed-support. There is therefore no runway over said part 15, and unless other means be provided therefor there is no means by which the camera-front may be moved for focusing purposes beyond the cross-bar 3 in the camera-box. This would constitute a serious defect in the camera; but we obviate the same by providing a supplemental detachable runway extension 23, formed upon or secured to the block 24, adapted to fit within the guideway 8 on the part 15 of the bed-support 5. This runway extension 23 and the block 24 on which it is formed are only brought into use when the part 16 of the bed-support 5 is depressed and it is desired to form a continuation of the runway on the cross-bar 3 outwardly to and above the part 15 of the bed-support 5. The block 24, with the runway extension 23 thereon, is normally located at some suitable point out of the way within the camera-box 1. To retain the same in place when not in use, we have shown guideways 25 on the inner surface of the top of the camera-box 1, in which the block 24 is adapted to fit. When the block 24 is inserted within the guideways 8 on the upper surface of the part 15 of the bed-support 5, the camera-front may be moved outwardly to a point above the part 15 of said bed-support for focusing purposes.

While the part 5 has been referred to throughout this specification as the "bed-support," it may constitute the bed as a whole when the bed is not of the extension type, the same being provided with a suitable runway for the camera-front. Where the term "bed-support," therefore, is used in the following claims, it is intended that the same shall comprehend not only the support or base portion of an extension-bed, but the bed as a whole.

Having now described our invention, what we claim is—

1. In a photographic camera, a camera-box, a bed-support made in two parts, the inner of said parts being hinged to said box, and the outer of said parts being hinged to the inner, links connecting the inner of said parts with said box, and means coöperating with said links for locking the two parts of said supports to each other.

2. In a photographic camera, a camera-box, a bed-support made in two parts, the inner of said parts being hinged to said box, and the outer of said parts being hinged to the inner, links connecting the inner of said parts with said box, and locking connections between the outer of said parts and said links for retaining the two parts of said support in line with each other.

3. In a photographic camera, a camera-box, a bed-support made in two parts, the inner of said parts being hinged to said box, and the outer of said parts being hinged to the inner, links connecting the inner of said parts with said box, and laterally-movable arms on the outer of said parts having projections thereon adapted to engage said links for locking the two parts of said support in line with each other.

4. In a photographic camera, a camera-box, a bed-support made in two parts, the inner of said parts being hinged to said box, and the outer of said parts being hinged to the inner, links connecting the inner of said parts with said box, spring-arms secured to the outer of said parts extending upwardly and rearwardly, and projections on said arms adapted to engage the inner edges of said links for locking the two parts of said support in line with each other.

5. In a photographic camera, a camera-box, a bed-support made in two parts, the inner of said parts being hinged to said box, and the outer of said parts being hinged to the inner, links connecting the inner of said parts with said box, arms secured to the outer of said parts, extending upwardly and rearwardly therefrom, and having their free ends capable of lateral movement, projections on said arms adapted to engage said links for locking the two parts of said support in line with each other, and engaging portions on said arms coöperating with the inner of said parts for limiting the downward swinging movement of the outer of said parts.

6. In a photographic camera, a camera-box, a bed-support made in two parts, the inner of said parts being hinged to said box, and the outer of said parts being hinged to the inner, links connecting the inner of said parts with said box, spring-arms secured to the outer of said parts and extending upwardly and rearwardly therefrom, projections on said arms adapted to engage said links for locking the two parts of said support in line with each other, and depending fingers on said arms adapted to engage the inner of said parts, and constituting stops for limiting the downward swinging movement of the outer of said parts.

7. In a photographic camera, a camera-box, an extension-bed comprising a bed-support made in two parts and extensible bed-sections mounted thereon, the inner of said parts being hinged to said box, and the outer of said parts being hinged to the inner and adapted to be swung downwardly thereon, a detachable runway extension, and means for securing said runway extension to the inner of said parts.

8. In a photographic camera, a camera-box, an extension-bed comprising a bed-support made in two parts and extensible bed-sections mounted thereon, the inner of said parts being hinged to said box, and the outer of said parts being hinged to the inner and adapted to be swung downwardly thereon, alined guideways on the two parts of said bed-support on which one of said bed-sections is adapted to slide, a detachable runway extension, and a support on which said extension is mounted adapted to fit with the guideways on the inner of said parts.

In testimony whereof we have hereunto set our hands in presence of two subscribing witnesses.

JOHN A. ROBERTSON.
CHAS. E. HUTCHINGS.

Witnesses:
FRED D. MORGAN,
GEO. W. REILLY.